Oct. 12, 1965

N. D. SMITH, JR., ETAL 3,211,252

METHOD AND APPARATUS USING SEISMIC ENERGY
FOR DETECTING DISCONTINUITIES

Filed March 29, 1962

INVENTORS:
N. D. SMITH, JR.
C. B. VOGEL

BY: Theodore E. Bieber

THEIR ATTORNEY

Oct. 12, 1965 N. D. SMITH, JR., ETAL 3,211,252
METHOD AND APPARATUS USING SEISMIC ENERGY
FOR DETECTING DISCONTINUITIES
Filed March 29, 1962 2 Sheets-Sheet 2

INVENTORS:
N. D. SMITH, JR.
C. B. VOGEL

BY: *Theodore E. Bieber*

THEIR ATTORNEY

United States Patent Office 3,211,252
Patented Oct. 12, 1965

3,211,252
METHOD AND APPARATUS USING SEISMIC ENERGY FOR DETECTING DISCONTINUITIES
Noyes D. Smith, Jr., Bellaire, and Charles B. Vogel, Houston, Tex., assignors to Shell Oil Company, New York, N.Y., a corporation of Delaware
Filed Mar. 29, 1962, Ser. No. 183,620
1 Claim. (Cl. 181—.5)

This invention pertains to a new and useful sonic method for detecting the presence of discontinuities or inhomogeneity in materials.

The detection of such discontinuities or inhomogeneity is useful in many branches of industry. For example, it is important in the inspection of metal machine parts to detect the presence of small cavities or imperfections which may eventually lead to failure of the part. Another use of the method is to inspect rocks through which a borehole is drilled in mineral exploration, since the presence of discontinuities in this case may indicate the presence of oil filled pore spaces.

To explain the invention, it is useful to discuss the behavior of elastic waves when they impinge upon a discontinuity. When primary or incident waves impinge on a surface of discontinuity, that is substantially plane for distances larger than a wave length ($r \gg \lambda$ where $r$ is radius of curvature of the surface and $\lambda$ is wave length), then the surface gives rise to secondary waves for which the shape of the wave front is a function of both the shape of the primary wave front and the shape of the surface. Such secondary waves are said to be reflected. For example, when primary waves strike a plane surface, the secondary, or reflected waves, have a wave front with the same shape as that of the primary waves.

The situation is quite different, however, where the wave impinges upon a surface containing a discontinuity, e.g., a sharp edge. In this case, the incident waves bend around the discontinuity and secondary waves are produced that are cylindrical or spherical, substantially independent of the shape of the incident wave front. Such secondary waves are said to be diffracted. For example, where plane waves strike a sharp edge bounding a plane surface, there are produced at the edge diffracted waves which travel away from the edge in all directions, independent of the direction of the incident waves.

Where the radius of curvature of a surface becomes small compared with wave length (e.g., where the surface is that of a small particle) a phenomenon similar to diffraction occurs and spherical or cylindrical secondary waves are produced. These are called scattered waves. For example, where plane waves impinge on a very small obstacle, spherical secondary waves are produced. Such scattering by small obstacles is usually called Rayleigh scattering and is characterized by the fact that the intensity is proportional to $1 + \cos^2\theta / \lambda^4$ where $\theta$ is the angle between the direction of incident radiation and that in which intensity is measured.

It will be readily appreciated that scattered and diffracted waves can be produced in any elastic material containing discontinuities as explained above. In general, if a material is inhomogeneous, the amplitude of the scattered waves will be a function of the size, number, and disposition of the discontinuities, which will constitute scattering centers. This invention thus consists in detecting the presence and measuring the amplitude of waves diffracted and scattered by discontinuities within an inhomogeneous elastic material, when the latter is irradiated with sonic vibrations.

It is thus seen that this method is quite different from those which make use of directly transmitted, refracted or reflected energy. In the latter, scattered and diffractured waves are no doubt produced, but no distinction is made between these and other waves in the detection and measurement. It is thus a distinct object of this invention that scattered and diffracted waves are observed substantially separate from reflected, directly transmitted, or refracted waves.

Accordingly, it is the principal object of this invention to provide a unique sonic method for detecting the presence of discontinuities or voids in materials.

A further object of this invention is to provide a novel sonic method for detecting discontinuities or voids in materials which utilizes the waves that are diffracted or scattered by the discontinuities or voids to detect the presence thereof.

A still further object of this invention is to provide a sonic method for inspecting materials to detect the presence of discontinuities therein that utilizes a transmitter for generating substantially plane elastic waves that are directed to impinge upon the material and a receiver that is adjusted to discriminate against the direct and reflected waves and to detect substantially only the scattered or diffracted waves.

The above objects and advantages of this invention are achieved by providing a method utilizing sonic energy for detecting discontinuities or voids within a material. The method utilizes a transmitter for generating sonic waves which impinge upon an object to be inspected. The waves as diffracted or scattered by the discontinuity in the material are received to the substantial exclusion of the directly transmitted or reflected waves. The axes of the transmitter and receiver are disposed in a configuration that discriminates against the reception of energy from direct and reflected waves, and the receiver is adjusted to provide an output proportional to the energy that is received in addition to any energy that is received from the direct and reflected waves. The amplitude of the received scattered and diffracted waves is then utilized as a measure or an indication of the presence of discontinuities in the material.

The above objects and advantages of this invention will be more easily understood from the following detailed description when taken in conjunction with the attached drawings, in which.

Figure 1:
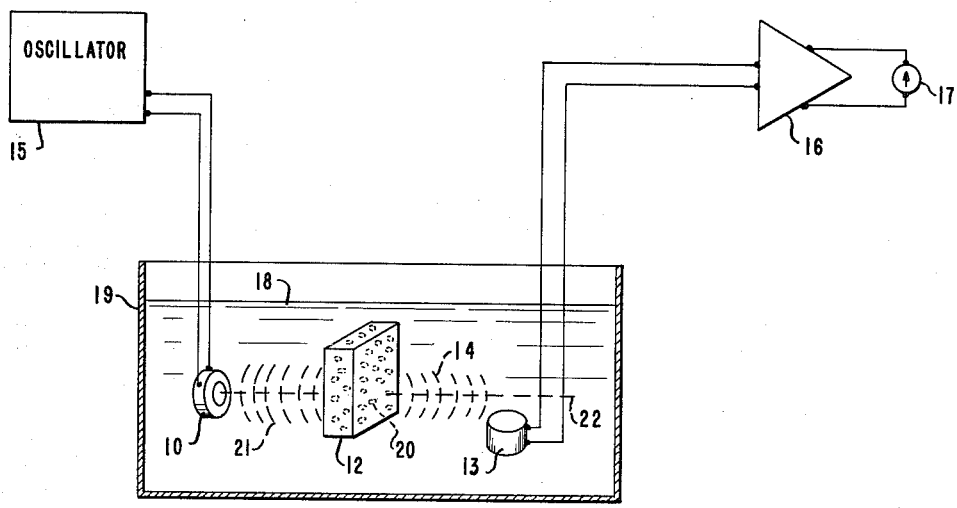
FIGURE 1 is a simplified diagram showing a combination of apparatus suitable for carrying out the method of the invention.

FIGURE 1 shows a simple combination of apparatus for performing the method of this invention to inspect a slab of material which may be inhomogeneous. In FIGURE 1, the slab of material to be inspected 12 containing discontinuities 20 (by way of example, a piece of Lucite containing air bubbles) is shown submerged in a tank 19 partially filled with oil 18 or some other good transmitter of elastic waves. The material to be inspected 12 is interposed between a transmitter of elastic waves 10 and receiver 13. The transmitter 10 and receiver 13 are so positioned that the receiver 13 lies off the axis 22 of transmitter 10. Transmitter 10 is constructed so as to produce substantially plane waves, and may be constructed of a suitably mounted slab of quartz. Receiver 13 may be so constructed as to be sensitive in all directions and may be constructed of a suitably mounted cylinder of barium titanate. For some purposes, it will be desirable to make receiver 13 sensitive substantially in only one direction and to dispose it so that its axis of sensitivity intersects the axis of transmitter 10 between the surfaces of slab 12. This arrangement will serve to minimize the effect of surface roughness upon measurements. The transmitter 10 is connected to a source of alternating current 15, for example, an oscillator. The receiver 13 is connected to an amplifier 16 and to a suitable indicator 17, such as a vacuum tube voltmeter. The frequency of transmitter 10 and oscillator 15 is so chosen that the wave length of vibrations produced is considerably larger than the maximum dimension of the air discontinuities 20. For example, if these are air-filled cavities with a maximum diameter of $1/100$ inch and if the velocity of sound in oil 18 is 5,000 feet per second, then the resonant frequency of the transducer could be, for example, 600 kc. Under these conditions, the transmitter 10 emits substantially plane waves 21 which impinge upon the material 12 where scattered waves 14 are produced that are intercepted by receiver 13, producing an indication on indicator 17, showing the presence in material 12 of discontinuities 20. It will be readily appreciated that in the absence of discontinuities 20, plane wave 21 passes without distortion through material 12 and, in this case, is not intercepted by receiver 13, which is positioned considerably off the axis of transmitter 10 for this purpose.

From the above description of the apparatus of FIGURE 1, it can be appreciated that an apparatus has been provided which will perform the method of this invention. More particularly, the transmitter 10 will generate plane sonic waves which are directed to impinge upon the material 12 being tested. In addition, the waves 21 will have a wave length which is long compared to the maximum dimension of the void 20 within the material 12. Thus, the waves 21 will be diffracted when they pass through the voids and detected by the receiver 13. The receiver 13 is displaced from the axis of the transmitter 10 so that it partially discriminates against the directly transmitted or reflected waves. Thus, the receiver will respond primarily to the diffracted waves. Finally, the amplitude of the diffracted waves are measured by means of the vacuum tube voltmeter 17.

Figure 2:
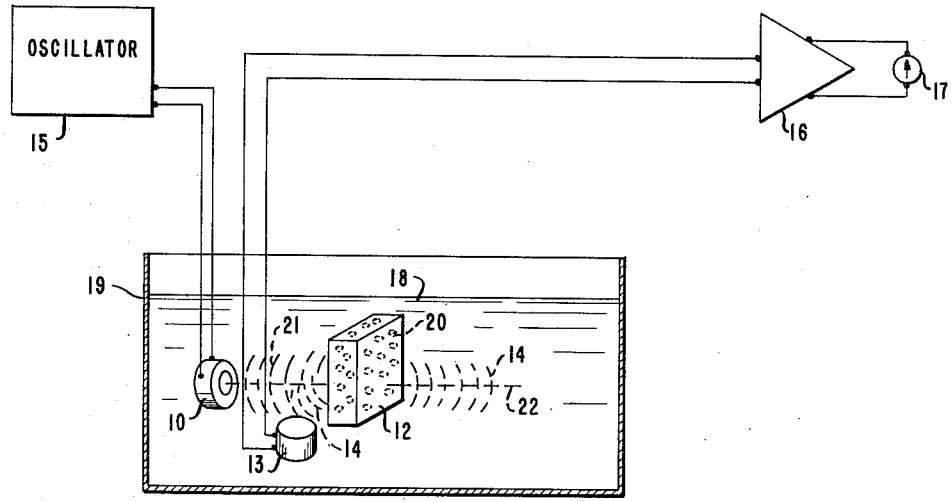
FIGURE 2 is an alternative combination of apparatus for carrying out the method of this invention.

FIGURE 2 shows a combination of apparatus similar to FIGURE 1, and elements in FIGURE 2 that are similar to those in FIGURE 1 bear similar numbers. This figure, however, illustrates the application of the method where the transmitter 10 and receiver 13 are placed on the same side of the material 12 being inspected. In this case, the scattered wave 14 intercepted by the receiver 13 is the wave that is scattered back toward the transmitter. In FIGURE 2, the receiver 13 is again positioned off the axis 22 of transmitter 10, and for the same reason. As mentioned in connection with FIGURE 1, the receiver may be made directional and positioned so its axis intersects that of the transmitter between the surfaces of slab 12.

The apparatus shown in FIGURE 2 will also perform the method of this invention and differs from the apparatus of FIGURE 1 in that the transmitter and receiver are disposed on the same side of the material. It should be noted that the sensitive axis of the receiver is still displaced from the sensitive axis of the tranmitter and thus will discriminate against directly transmitted and reflected waves.

Figure 3:
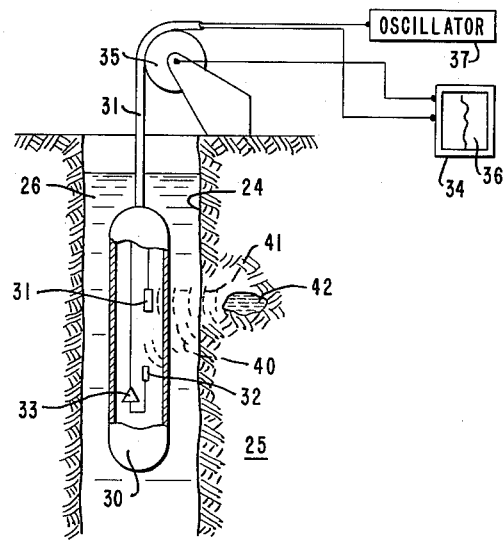
FIGURE 3 is a combination of apparatus suitable for using the method in mineral exploration in boreholes; and, FIGURE 4 is a combination of apparatus suitable for using the method to inspect pipe.

FIGURE 3 illustrates a combination of apparatus suitable for using the method of this invention for mineral exploration in boreholes. Here the transmitter 31 and the receiver 32 are mounted in a housing 30 suitable for lowering the combination into a borehole 24 drilled through earth materials 25. The housing 30 is lowered into the borehole 24 by means of cable 31 containing insulated electrical conductors. The borehole 24 must be at least partially filled with a fluid 26 suitable for transmitting elastic waves. A suitable fluid would be normal drilling mud used for drilling the borehole.

Receiver 32 which is sensitive in all directions, is connected to a downhole amplifier 33 that, in turn, is connected by means of conductors in the cable 31 to a chart recorder 34 located at the surface. The chart recorder 34 is driven by a Selsyn unit incorporated in a measuring sheave 35 over which the cable 26 passes. Thus, the chart record 36 will be directly related to the location of the instrument in the borehole 27. Transmitter 31 is connected likewise to a source of alternating current or oscillator 37 by the cable 31. When the housing 30 is lowered to some particular depth, the reading of chart recorder 34 is proportional to the amplitude of scattered waves 40 produced when plane waves 41 impinge upon discontinuity 42, such as a void or oil-filled cavity in earth material 25. It will be seen that by continuously lowering housing 30 into the borehole and by making a continuous record on the chart recorder 34, a log will be obtained of the inhomogeneity of earth material 25 through which borehole 24 is drilled. Where the inhomogeneity is caused by voids or cavities, the chart record 36 will correspond to porosity of earth material 25. For some purposes, it will be desirable to make receiver 32 substantially sensitive in only one direction and to position it so that its axis intersects that of transmitter 31 beyond the surface of borehole 24.

The logging instrument described above with relation to FIGURE 3 is operated by lowering the housing 30 into the borehole 24. As the housing 30 is lowered a chart record 36 is made of the amplitude of the receiver signal with relation to the depth of the housing within the borehole. As explained above with reference to FIGURE 1, the amplitude of the receiver signal is related to the number and size of inhomogeneities present in the formation surrounding the borehole. Thus, one may by inspection of the record 36 accurately locate the position of various porous formations along the borehole.

Figure 4:
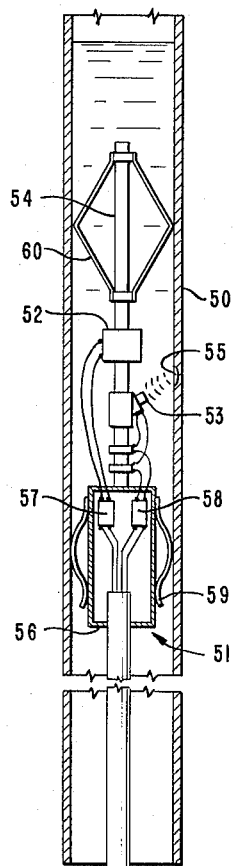

Referring to FIGURE 4, there is shown an apparatus utilizing the method of this invention suitable for inspecting pipe for the presence of holes or other imperfections. The apparatus utilizes a probe 51 which is inserted into the interior of a pipe member 50. The probe is provided with a transmitter 52 and a receiver 53 both of which are mounted on a rod member 54. It should be noted that the receiver 53 is axially displaced from the transmitter 52 and is disposed at an angle to the axis of the pipe to receive the waves that are diffracted or scattered by imperfections, as for example, the hole 55 in the pipe member. The probe is provided at its lower end with an instrument case 56 that contains a power supply 57 for the transmitter 52 and an amplifier 58 for the receiver 53. In addition, centering springs 59 are provided on the instrument case for centering it in the pipe 50 while a similar set of centering springs 60 are provided at the upper end of the rod member 54 for centering it in the pipe. The probe 51 is coupled to an external power supply 61 and a measuring means 62 by means of cable 63. The cable 63 should provide sufficient electrical circuits for various portions of the probe member and in addition provide a means for inserting the probe within the pipe 50 and withdrawing it therefrom. The measuring means 62 may take various forms as for example, a vacuum tube voltmeter.

The apparatus shown in FIGURE 4 operates in substantially the same manner as that shown and described in FIGURE 3 for logging boreholes. The apparatus utilizes a transmitter that generates or radiates substantially plane waves in a radial direction and a receiver that is disposed to receive diffracted or scattered waves while discriminating against reflected or direct waves. In order to discriminate against reflected or direct waves, the receiver 53 is displaced from the sensitive axis of the transmitter 52. This is accomplished by axially spacing the receiver 53 from the transmitter 52 and then directing the receiver so as to intercept the defracted or scattered waves.

While the instrument shown in FIGURE 4 is illustrated as being coupled to the external power supply and measuring means 62 by cable 63 these units could obviously be incorporated within the probe 51. By incorporating the units within the probe 51, the probe could be passed through long pipe lines to inspect for the presence of corrosion or other discontinuities.

Several embodiments of this invention have been illustrated showing various means for performing the method thereof. Accordingly, this invention should not be limited to the details described herein but only to broad spirit and scope thereof.

We claim as our invention:

An acoustic well logging process which comprises:
producing acoustic plane waves that are transmitted along central axes of preferential sensitivity from points located within a borehole of a well that contains a fluid capable of transmitting acoustic waves;
moving the points at which the waves are produced while directing the waves into the earth formations surrounding the borehole;
receiving those of the acoustic waves which are diffracted and scattered by and at the surfaces of anomalies in the earth formations and transmitted through the fluid in the borehole to points that are fixed relative to the points at which the plane waves are produced, said receiving points in addition being located off the axes along which the plane waves are transmitted;
producing a quantity proportional to the depths at which the plane waves are produced; and
recording at the depth of said points at which acoustic waves are produced the variation of the amplitude at which the diffracted and scattered acoustic waves are received at said points of reception, whereby the positions of porous formations along the borehole are indicated by the record.

References Cited by the Examiner

UNITED STATES PATENTS

| | | | |
|---|---|---|---|
| 2,795,133 | 6/57 | Ots | 73—67.7 |
| 2,825,044 | 2/58 | Peterson | 340—18 |
| 2,893,239 | 7/59 | Renaut | 73—67.7 |
| 2,943,694 | 7/60 | Goodman | 181—.5 |
| 3,132,510 | 5/64 | Buchan et al. | 73—67.7 |
| 3,140,600 | 7/64 | Howry | 73—67.7 |

FOREIGN PATENTS 569,598　2/33　Germany.

SAMUEL FEINBERG, *Primary Examiner.*

CHESTER L. JUSTUS, BENJAMIN A. BORCHELT,
*Examiners.*